United States Patent

Surles

[11] Patent Number: 5,692,566
[45] Date of Patent: Dec. 2, 1997

US005692566A

[54] FORMATION TREATING METHOD

[75] Inventor: Billy Wayne Surles, Houston, Tex.

[73] Assignee: Texaco Inc., White Plains, N.Y.

[21] Appl. No.: 589,698

[22] Filed: Jan. 22, 1996

[51] Int. Cl.$^6$ ............................................. E21B 33/138
[52] U.S. Cl. .................................... 166/295; 166/300
[58] Field of Search ................................ 166/295, 300, 166/288, 270, 131

[56] References Cited

U.S. PATENT DOCUMENTS

| | | | |
|---|---|---|---|
| 4,042,032 | 8/1977 | Anderson et al. | 166/276 |
| 4,427,069 | 1/1984 | Friedman | 166/295 |
| 4,699,543 | 10/1987 | Mio et al. | 404/109 |
| 4,800,960 | 1/1989 | Friedman et al. | 166/276 |
| 4,817,720 | 4/1989 | Friedman et al. | 166/295 |
| 4,842,072 | 6/1989 | Friedman et al. | 166/295 |
| 4,895,207 | 1/1990 | Friedman et al. | 166/276 |
| 4,898,750 | 2/1990 | Friedman et al. | 427/221 |
| 4,903,770 | 2/1990 | Friedman et al. | 166/288 |
| 4,938,287 | 7/1990 | Friedman et al. | 166/288 |
| 4,964,465 | 10/1990 | Surles | 166/295 |
| 5,005,647 | 4/1991 | Friedman et al. | 166/295 |
| 5,005,648 | 4/1991 | Friedman et al. | 166/295 |
| 5,010,953 | 4/1991 | Friedman et al. | 166/288 |
| 5,040,604 | 8/1991 | Friedman et al. | 166/295 |
| 5,159,980 | 11/1992 | Onan et al. | 166/294 |
| 5,199,490 | 4/1993 | Surles et al. | 166/270 |
| 5,199,492 | 4/1993 | Surles et al. | 166/295 |
| 5,284,206 | 2/1994 | Surles et al. | 166/270 |
| 5,285,849 | 2/1994 | Surles et al. | 166/295 |
| 5,293,939 | 3/1994 | Surles et al. | 166/295 |
| 5,377,759 | 1/1995 | Surles et al. | 166/295 |
| 5,423,381 | 6/1995 | Surles et al. | 166/295 |
| 5,520,251 | 5/1996 | Surles et al. | 166/307 |
| 5,551,513 | 9/1996 | Surles et al. | 166/278 |
| 5,567,088 | 10/1996 | Shotts et al. | 405/270 |

OTHER PUBLICATIONS

"Furan Derivatives", Encyclopedia of Chemical Technology, vol. 11, pp. 510–516.

*Primary Examiner*—Frank Tsay
*Attorney, Agent, or Firm*—Henry H. Gibson; Stephen H. Cagle

[57] ABSTRACT

Disclosed is an improvement in a method for treating wells penetrating subsurface formations and in fluid communication with at least a portion of the subsurface formation for the purpose of sand consolidation, water exclusion, or well plugging, employing a treating fluid comprising acid catalyzed polymerizable resin, a hydrolyzable ester and an acid catalyst, which improvement provides greater control of set time and greater safety, which comprises replacing from a small percent up to the entire amount of hydrolyzable ester with an acetate derivative of the polymerizable resin, and optionally replacing a small percent up to the entire amount of the polymerizable resin with the acetate derivative. In the preferred embodiment furfuryl acetate replaces part to all of the hydrolyzable ester and, optionally, a percentage of the furfuryl alcohol.

18 Claims, No Drawings

FORMATION TREATING METHOD

FIELD OF THE INVENTION

This invention is related to formation treating methods. In particular this invention is related to methods for treating wells penetrating subterranean formations and in fluid communication with at least a portion of the subterranean formation for the purpose of sand consolidation, water exclusion, well plugging, or any other procedures for the purpose of binding unconsolidated particulate matter and/or creating a barrier.

Still more particularly, this invention pertains to improvements in a method for accomplishing sand consolidation, water exclusion or well plugging in producing wells utilizing a single fluid containing a polymerizable resin, an acid catalyst, and a hydrolyzable ester, which comprises replacing part or all of the polymerizable oligomer and/or straight chained hydrolyzable ester with an ester which will hydrolyze to produce by-product which will contribute to the final polymerization product.

The advantages include greater control of set time and the ability to increase the overall concentration of the polymerizable alcohol. The improvements also provide a safer system, because the possibility of the mixture boiling at the surface can be almost entirely eliminated.

BACKGROUND OF THE INVENTION

Formation treating for purposes of sand consolidation, water exclusion or well plugging for abandonment are well known terms applying to procedures routinely practiced in the commercial production of petroleum. When wells are completed in petroleum-containing formations which also contain unconsolidated granular mineral material such as sand or gravel, production of fluids from the formation causes the flow of the particulate matter, e.g. sand, into the wellbore, which often leads to any one of several difficult and expensive problems. Sometimes a well will "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

Another problem in oil production is encountered when a well is in fluid communication with a section that includes one or more oil producing intervals and one or more water producing intervals. Production from such a zone results in production of some oil and some water. Since the viscosity of water is less than the viscosity of oil, a much larger volume of water than oil is frequently produced. There are many prior art processes for controlling fluid entry into wells, but none are entirely satisfactory. In some cases a polymerizable resin is used for water shutoff and the closer the downhole and surface temperature, the more likely there will be problems with premature setting.

Problems are also encountered in commercial petroleum production operations when it is desired to completely plug a well which is to be abandoned.

Another problem often encountered when treating formations, especially in hot climates, is that the treating fluids will boil at the surface and create a danger.

Sand control, water exclusion, well plugging problems, and potential solutions have been the subject of extensive research by the petroleum industry.

Significant contributions have been described, for example, in U.S. Pat. Nos. 4,842,072; 5,005,647; 5,010,953; 5,284,206; 5,285,849; 5,293,939; and 5,377,759, all assigned to Texaco Inc. and incorporated by reference herein in their entirety.

In U.S. Pat. No. 4,842,072 for "SAND CONSOLIDATION" there is disclosed a particularly effective method for consolidating sand utilizing a mixture of a polymerizable resin such as an oligomer of furfuryl alcohol and a diluent such as butyl acetate and an oil soluble, slightly water soluble acid catalyst such as orthonitrobenzoic acid which is injected followed by injection of salt water to reestablish permeability.

The process in U.S. Pat. No. 4,903,770 for "SAND CONSOLIDATION" employs a fluid comprising a polymerizable monomer such as furfuryl alcohol and, as a diluent, a polar organic solvent such as methanol, and a strong, non-volatile acid catalyst such as sulfuric acid, mixed with steam to form a multiphase or aerosol treating fluid. An ester such as ethyl or butyl acetate is incorporated in the fluid when the steam quality is less than 80 percent.

U.S. Pat. No. 5,010,953 which issued Apr. 30, 1991, teaches a sand consolidating process using a polymerizable compound such as furfuryl alcohol, a diluent such as a low molecular weight alcohol, an acid catalyst and an ester and, as an additive to reduce shrinkage, a copolymer of starch and a synthetic polymer such as acrylamide or acrylate.

U.S. Pat. No. 5,005,647 which issued Apr. 9, 1991, discloses a process for shutting off permeable zones in wellbores to reduce excess water flow using fluids similar to those described in U.S. Pat. No. 5,010,953 discussed above.

U.S. Pat. No. 5,005,648 which issued Apr. 5, 1991, describes a method of treating permeable zones in a formation to reduce water flow into a well completed therein by injecting a fluid-containing polymerizable compound, an ester, and an acid catalyst such as orthonitrobenzoic acid or toluene sulfonic acid.

U.S. Pat. No. 4,938,287 which issued Jul. 3, 1990, describes a process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

In U.S. Pat. No. 5,285,849 which issued Feb. 15, 1994, a formation treating method is disclosed using a fluid containing a polymerizable resin such as furfuryl alcohol, an acid catalyst such as toluene sulfonic acid or o-nitrobenzoic acid and an ester. The acid and acid concentration are selected to result in a polymerization set time of 1–24 hours.

In U.S. Pat. No. 5,377,759, issued Jan. 3, 1995, there is disclosed a well treating method for sand consolidation, fluid exclusion or plugging wells prior to abandonment which is applicable to formation temperatures below 225° F. and especially below 175° F.

These patents address different aspects of treating formations to consolidate sand, exclude water, or plug a well using generally an internal catalyst system comprising a polymerizable resin, an acid catalyst and a hydrolyzable ester. Variations of this system have addressed significant needs in the art. The system preferably employs a furfuryl alcohol monomer or oligomer, a hydrolyzable ester and an acid catalyst and has been used with consistently high success rates in many field applications.

The above-described processes have been extremely successful in treating wells in many formations under a variety of conditions, however, there are situations where it would be helpful if it were possible to use greater concentrations of polymerizable monomer or oligomer to control or delay the acid catalyzed reaction. This would provide improvements in safety, reduce waiting time, and reduce chances of premature setting.

One problem often encountered in the field is when it would be desirable to increase the overall concentration of resin in the mixture in order to work faster or provide greater control of set time, but the overall concentration of resin cannot be increased without upsetting the balance and causing the reaction at the surface to become too hot and possibly out of control.

A significant safety problem occurs when the resin, ester, and acid are mixed at the surface. If the temperature is, say >80° F., the material begins to react. Since the reaction is exothermic the mixture's temperature raises to the azeotropic boiling point and starts to gently boil. Once the resin composition is downhole the boiling does no harm, but at the surface it constitutes a safety hazard and generates volatile material into the air. In addition, the boiling of the resin composition makes it harder to pump downhole. One way of addressing this problem is to ice the exterior of the tanks, however that approach is quite expensive and often locationally impractical.

Presently, attempts to address this problem by changing the concentration of the different components in the resin system are not effective. If the acid is reduced the system will not react quickly enough downhole. The maximum concentration of resin in the overall mixture that can safely be handled on the surface is about 50% resin with the remainder comprising solvents. If a larger amount of polymer-alcohol, i.e. furfuryl alcohol, is added at the surface the reaction becomes uncontrollable.

It would be of significant value in the art if it were possible to effectively include a greater percentage of resin in the resin mixture. It would also be valuable if it were possible to delay the reaction of a resin system until it was downhole, to reduce safety hazards such as boiling at the surface.

It is an object of this invention to provide a method for safely increasing the concentration of a polymerizable resin. It is also an object of the present invention to provide a method for greater control of set time of a polymerizable resin. In addition, other objectives are allowing more handling time at the surface, while still effecting a quick reaction downhole, and securing greater safety by eliminating boiling at the surface and reducing the exposure to undesirable chemicals at the surface.

SUMMARY OF THE INVENTION

In accordance with the foregoing the present invention comprises an improvement in a method for treating a well penetrating a subsurface formation by:
 introducing into the formation an effective amount of a treating fluid comprising a monomer or oligomer which can be acid catalyzed at the formation temperature to polymerize in the flow channels of the formation, said treating fluid also containing a hydrolyzable ester and an effective amount of acid catalyst,
 wherein said improvement provides easier handling at the surface and greater control of set time and comprises:
 substituting for all or part of the ester and optionally all or part of the alcohol monomer or oligomer an ester derivative of the polymerizable alcohol monomer or oligomer.

In the preferred embodiment furfuryl acetate is used to replace butyl acetate and, optionally, to replace varying amounts of the furfuryl alcohol.

This improvement provides more flexibility in set time for the resin system, greatly facilitates handling, and greatly reduces safety hazards.

DESCRIPTION OF THE INVENTION

In the method of this invention wherein a mixture of polymerizable resin, having dispersed therein an acid catalyst, and an organic polar diluent is prepared for injection into a formation, for use in, for example, sand consolidation, water exclusion, or well plugging, the improvement comprises substituting varying amounts of the diluent and/or polymerizable resin with furfuryl acetate, in order to provide greater stability in handling, reduce uncontrollable reactions at the surface, and provide greater flexibility with the set time.

The method employs a fluid containing as a major component a resin which is catalyzed by the presence of an acidic material to polymerize into a rigid solid mass which occupies the pore spaces of the portion of the formation in which the treating fluid is introduced, thereby consolidating sand, creating a barrier or plugging a zone.

The resin which is especially preferred for use in this formation treating method is a furfuryl alcohol oligomer. Any resin which will polymerize upon exposure to heat and contact with an acid catalyst can be used, however, furfuryl alcohol oligomer $(C_4H_3OCHO)_n$ is the particularly preferred polymerizable resin. This resin has the advantage of being relatively inexpensive and having the characteristic of auto-polymerizing on exposure to acid catalyst, forming a thermal-setting resin which cures to an insoluble mass that is highly resistant to chemical attack as well as to thermal degradation. The particularly preferred commercial form in which this resin is available is "Quacorr 1300® or "QO 1300®" (a furfuryl alcohol oligomer) sold by QO Chemicals. This resin is ordinarily obtained commercially in a form containing 90 to 95 percent furfuryl alcohol oligomer.

The furfuryl alcohol oligomer emulsion utilized in this process is so viscous that it must be diluted with an appropriate solvent in order to permit it to be pumped into the formation, and to accomplish relatively complete filling of void spaces in the formation. Any solvent for the furfuryl alcohol oligomer would accomplish this objective. It is possible, however, to accomplish this and another important objective by using as the diluent a hydrolyzable ester. The other objective is removal of water. The polymerization of the furfuryl alcohol oligomer produces water and the water produced by polymerization eventually limits the polymerization reaction. If water produced during polymerization of furfuryl alcohol oligomer can be removed, it is possible to force the polymerization reaction to proceed further toward completion and thereby produce longer polymer chains than would result if water were left in the polymer reaction mass. A hydrolyzable ester will remove water as it is produced, leading to the formation of longer chain polymers which result in a stronger, more durable polymer matrix which binds the sand grains together. Accordingly, the preferred diluent for the furfuryl alcohol oligomer is a hydrolyzable ester. Examples of suitable hydrolyzable esters are straight chain esters of less than six carbons. Suitable esters include, methyl acetate, ethyl acetate, propyl acetate and butyl acetate. The preferred ester is butyl acetate.

Another component of the method is an acid which can catalyze the polymerization. It is important for this procedure that the acid catalyst utilized be oil soluble so that it may be incorporated in the resin solvent solution. This permits thorough mixing of the catalyst which is essential in order to ensure that the polymerization reaction occurs uniformly throughout the entire mass of well treating chemical placed in the formation. Prior art methods which utilize a catalyst injected in a non-miscible fluid either before or after injection of the fluid containing the polymerizable resin, or present in a non-miscible phase of an emulsion polymer fluid, do not accomplish uniform reactions such as are possible by use of a soluble catalyst. The catalyst must also be one which exhibits temperature sensitivity so that the catalytic polymerization does not occur during the time that the fluid is prepared and mixed on the surface of the earth or pumped into the formation. It is equally important that once the fluid is placed in the formation and left in a quiescent state for a period of time sufficient to ensure temperature equalization with the formation, that the polymerization reaction occur rapidly in order to permit completion of the procedure in an relatively brief period of time, so the well can be put on production as soon as possible. Because of this dual requirement, the catalyst choice and concentration are both very critical to the proper function of the invention.

Typically a quantity of treating fluid is prepared containing from 40 to 60 percent of the furfuryl alcohol oligomer. As just mentioned the treating fluid also contains from 40 to 60 percent of an ester, such as ethyl acetate or butyl acetate. The fluid also contains an effective amount of acid catalyst, and the choice of acid and the concentration of acid employed in the treating fluid is determined to a large extent by the down-hole temperature of the formation being treated and by the permeability of the formation. It is desired that the set time, i.e. the time from formulation of the fluid until it is introduced in the other formation and begins to polymerize to form the plastic or solid mass which occupies the pore spaces of the treated interval of the formation, should be sufficient so the treating fluid will not leak or flow from the well bore into which the fluid is introduced, through the perforations or holes in the casing and into the formation immediately adjacent to the well before the polymerization has progressed to a point that flow no longer can occur. If the set time is too great, excessive leakage of the fluid will occur, and the fluid will not be confined to the immediate vicinity of the well bore and so an effective treatment will not be achieved. If the set time is too great, the injected fluid will not penetrate the porous formation to the extent desired, and so a successful and durable job will not be accomplished. Since the reaction rate is approximately first order dependent upon temperature, care must be taken in using the acid catalyst and in selecting the proper concentration of acid catalyst, in order to achieve a set time in the desired range of from 1 to 16 hours. If the formation temperature is less than about 250° F., our preferred catalyst is toluene sulfonic acid. At temperatures greater than 250° F., the preferred acid catalyst is orthonitrobenzoic acid.

In U.S. Pat. Nos. 4,842,072; 4,903,770; 4,938,287; 5,010,953; 5,005,647; 5,005,648; 5,285,849; and 5,377,759, cited above and incorporated herein by reference in the entirety, the hydrolyzable ester is a short straight chain ester typically selected from the group consisting of methyl acetate, ethyl acetate, propylacetate and butyl acetate and esters having similar structures and properties. The preferred ester is butyl acetate.

It has been discovered in the present invention that an ester derivative of the oligomer or monomer can be substituted for part or all of the hydrolyzable ester and/or furfuryl alcohol, depending on the operator's objective. An ester derivative can be any product of a carboxylic acid reacting with furfuryl alcohol. The preferred ester derivative of the polymerizable oligomer is furfuryl acetate. Furfuryl acetate will hydrolyze to produce a by-product that will contribute to the resin's polymerization.

Furfuryl acetate is not presently used in the art in this manner and is not a generally available chemical commodity. Furfuryl acetate is a unique ester. It is a much larger molecule than the short chain carbon esters mentioned above and it has properties more typical of an aromatic rather than a straight chain. In this case, surprisingly, furfuryl acetate possesses some of the same properties as the short chain hydrolyzable esters.

The key advantage of the properties of furfuryl acetate is that its hydrolyzation generates furfuryl alcohol. This allows the generation of furfuryl alcohol at a time subsequent to when the treating fluid is initially mixed.

The furfuryl acetate hydrolyzes and produces acetic acid and furfuryl alcohol. It can be employed in a manner similar to the short chain esters to consume water and drive the polymerization reaction, but with significant additional advantages including but not limited to:

1. Greater control of the resin mixture at the surface.
2. Greater control of set time.
3. Extended handling time.
4. Faster reaction time downhole.
5. Effectively permitting the use of greater concentrations of resin in the treating fluid.
6. Greater safety by eliminating boiling at the surface.

Furfuryl acetate does not hydrolyze at room temperature, but does hydrolyze readily at elevated temperatures (200° F.). When it hydrolyzes it produces furfuryl acetate and acetic acid. As in the formulation using a straight chain ester, the acetic acid does not contribute or detract from the final product. However, unlike a straight chained ester, the furfuryl alcohol by-product can contribute to the polymerization reaction because it produces the initial building block from which the polymer is made, and the release of the furfuryl alcohol is subject to control by temperature.

Using the method of this invention, all or part of the oligomer and/or hydrolyzable ester in the resin system containing polymerizable alcohol monomer or oligomer, an ester and an acid can be replaced. In some applications of resin technology furfuryl acetate would replace the short chain hydrolyzable ester. In other applications, primarily related to gas delivered sand control technology, the furfuryl acetate could replace either the short chain ester or the alcohol monomer, or both, depending on the primary concern.

The major advantage of replacing the short chain ester with furfuryl acetate is that it is possible to increase the ratio of resin to solvent, thereby increasing the amount of resin which can be delivered downhole. Where the primary concern is safety, furfuryl alcohol can also be replaced with furfuryl acetate. This would be more expensive than replacing just the short chain ester, but may be a worthwhile option in some situations.

One situation where it would be beneficial to be able to work with a higher concentration of oligomer is where a large volume of fluid must be pumped in a steam delivered sand control system, and where the operating time could be reduced if a higher percentage of furfuryl alcohol could be delivered in the mixture. Normally the maximum concentration of resin in the overall mixture which can safely be handled on the surface is about 50% resin. Presently when attempts are made to include greater concentrations of alcohol the reaction at the surface can become uncontrollable. Higher concentrations of furfuryl alcohol are not stable at room temperature. In a situation where the treatment fluid is composed of, for example, 40% furfuryl alcohol, 30% ethyl acetate and 30% methanol, plus a catalyst, using the method of this invention, ethyl acetate can be replaced with furfuryl acetate to effectively increase the concentration of furfuryl alcohol without affecting the stability of the treatment fluid at the surface, due to the fact that furfuryl acetate does not react with the catalyst at surface temperatures. However, once the mixture enters the steam downhole it hydrolyzes and produces furfuryl alcohol which then reacts with the furfuryl alcohol already present, thereby increasing the available furfuryl alcohol without the destabilizing effects which would occur if this takes place at the surface. Having this option available would contribute greatly to reducing operating costs by reducing the time required to treat a well. A greater number of wells could be treated in a given time period.

Another situation where the method of this invention is very advantageous is where it is desirable to generate furfuryl alcohol downhole for shutting off of water seeping into a well.

Presently, the polymerization rate of the resin is controlled by matching the downhole temperature with a given amount of catalyst. If the downhole temperature is a great deal higher than the surface temperature then the operator has plenty of time to work with the mixture at the surface. However, if the surface temperature is close to the downhole temperature then small delays in placing the resin can cause premature setting. This can be solved by using furfuryl acetate. Since it will form furfuryl alcohol downhole, and furfuryl alcohol is more reactive than the resin, the catalyst concentration can be reduced while still maintaining the same downhole set time. This makes the mixture much more stable at the surface and greatly reduces a major cause of operational failure.

In another embodiment, relating primarily to sand control, both the furfuryl alcohol and ester acetate can be replaced with furfuryl acetate. A situation sometimes encountered in the field is that surface temperatures are particularly high. In a field where there is a need to use steam delivery of resin for chemical sand consolidation in hot climates or in the summer, and temperatures on the surface are greater than, say 80° F., or even 100° F. or more, the chemical reaction produces enough internal heat that it causes the treatment solution to boil at the surface. This creates a safety problem due to the increased amount of flammable vapors, the increased splash hazard, and the increased difficulty in pumping.

Presently when the system is used in sand control the furfuryl alcohol and the ester acetate are mixed together to achieve the desired sand consolidating mixture. The furfuryl alcohol polymerizes to bind the sand grains together and it is this polymerization that produces the heat that causes the solution to boil. The ester acetate is necessary to react with water which is deleterious to the polymerization reaction. With the method of this invention the furfuryl alcohol and ester acetate can both be replaced with furfuryl acetate. The furfuryl acetate will hydrolyze into furfuryl alcohol and acetic acid. The furfuryl alcohol will then polymerize as previously described with the remaining furfuryl acetate acting as the water sponge and a continuous furfuryl alcohol source. The key to increased safety is that the reaction rate of the hydrolysis of furfuryl acetate is much slower than the polymerization reaction of furfuryl alcohol at temperatures below 125° F. This means the reaction is controlled at the surface in a manner which cannot be accomplished with the furfuryl alcohol. Just as important is the fact that the reaction is instantaneous at high temperatures (as in steam) which means it will yield the same reaction as the furfuryl alcohol monomer once in the steam line.

The following examples are given to demonstrate the method of the invention. It is understood that the examples are given only for illustration and the invention is not intended to be limited thereby.

EXAMPLE I

Sand Consolidation

A producing well is completed in a subterranean petroleum containing formation, the formation being from 8560 to 8588 feet. Considerable sand production has been experienced in other wells completed in this formation in the past, and so it is contemplated that some treatment must be applied in order to permit oil production from this formation without experiencing the various problems of unconsolidated sand production. This particular well has not yet been used for oil production, and so little sand has been produced from the formation. It is known that the sand is coated with formation crude, but is otherwise of a reasonable particle size to accommodate sand consolidation process using the natural sand present in the formation. It is decided therefore to inject treating fluid into the formation immediately adjacent to the perforation of the producing well in order to bind the naturally occurring sand grains together and form a stable mass which forms a permeable barrier to restrain the flow of formation sand into the well while still permitting the free flow of formation fluids including petroleum through the barrier. It is determined that it is sufficient to treat approximately 12 inches (1 foot) into the formation. Based on experience in this field, it is expected that the porosity of the formation to be treated is approximately 40%. The outside casing diameter of the well being treated is ten inches (radius=5.0 in. or <0.417 ft.). The volume of fluid necessary to treat this portion of formation is determined as follows:

$$V = (\pi(1.0 + 0.417)^2 - \pi(0.417)^2) \times (0.40(28)) = 64.5$$
$$\text{Cu. Ft} = 482.76 \text{ Gallons}$$

In order to accomplish adequate saturation of the portion of the unconsolidated sand formation adjacent to the production well, a total of 490 gallons of resin treating fluid is required. The resin employed in this procedure is "QUACORR 1300" obtained from QO Chemicals, which is an oligomer of furfuryl alcohol.

Present methods would indicate that 490 gallons of sand consolidation treating fluid be formulated by mixing 245 gallons of the above-described resin with 245 gallons of butyl acetate. Instead 245 gallons of resin is mixed with 245 gallons of furfuryl acetate.

Since the formation temperature is known to be 200° F., the desired concentration of toluenesulfonic acid is 1.0%. This requires 40 pounds of toluenesulfonic acid. In order to facilitate use of toluenesulfonic acid in this application, since the surface ambient temperature is 85° F., a mixture comprising 40 pounds toluenesulfonic acid and 4.9 gallons of methanol is prepared and then added to the resin-ester mixture.

Normally this fluid is injected into the formation at a rate of about 900 gallons per hour. Using the method of this invention the resin ester ratio is increased.

EXAMPLE II

Water Shutoff

An oil-production well in the Sour Lake field in Texas was producing water and oil with a water/oil ratio of >100 and it was decided to treat the formation to reduce the permeability and therefore the flow rate of water from the water-producing interval. Since the formation temperature of the oil-producing interval penetrated by this well was about 300° F., neither a cement squeeze nor a treatment with urea formaldehyde resin as is commonly available for this purpose was thought to be the preferred solution. The oil-producing zone was under the water-producing zone, so it was necessary to locate the boundary between these two zones and isolate them one from the other with a bridge plug set into the well. A total of five barrels of resin mixture was prepared for the purpose of treating this well. Using current methods the resin mixture would comprise 60% QUACOR 1300 Furan Resin®, an oligomer of furfuryl alcohol, 39 percent ethyl acetate and one percent o-nitrobenzoic acid. Using the method of this invention the 39% ethyl acetate was replaced with furfuryl acetate. This quantity of treating fluid was introduced into the well.

EXAMPLE III

Improved Safety in Steam Delivered Sand Consolidation

In an oil well in an arrid region surface temperatures are at least 80° F. and when resin systems for sand consolidation treatment containing furfuryl alcohol are prepared at the surface, the internal heat causes the treatment solution to boil. This generates increased amounts of flammable vapors in the air, causes splashing of hazardous chemicals, and makes it difficult or impossible to pump the solution downhole. One presently available solution is to ice down the tanks, but this is very expensive. The alternative is to cease operations. In the meantime formation sand is flowing into the well. It is determined that it is sufficient to treat approximately 12 inches (1 foot) into the formation. Based on experience in this field, it is expected that the porosity of the formation to be treated is approximately 40. The outside casing diameter of the well being treated is ten inches (radius=5.0 in. or 0.417 ft). The volume of fluid necessary to treat this portion of formation is determined as follows:

$$v = (\pi(1.0+.417)^2 - \pi(.417)^2) \times (0.40)(28)$$
$$= 64.5 \text{ Cu. Ft.}$$
$$= 482.76 \text{ Gallons}$$

In order to accomplish adequate saturation of the portion of the unconsolidated sand formation adjacent to the production well, a total of 490 gallons of resin treating fluid is required.

In order to treat this well successfully the density of the treating fluid should be at least 11.5 pounds per gallon. Tetrachloroethane is selected as the dense solvent to provide the desired density.

Using present methods the 490 gallons of sand consolidation treating fluid would be formulated by mixing 294 gallons of the above-described resin with 49 gallons of butyl acetate and 147 gallons of tetrachloroethane.

Using the method of this invention the 294 gallons of furfuryl alcohol and 49 gallons of butyl acetate are replaced with furfuryl acetate. Since the formation temperature is known to be 200° F. the desired concentration of toluenesulfonic acid is 1.0. This requires 40 pounds of toluenesulfonic acid. In order to facilitate use of toluenesulfonic acid in this application, since the surface ambient temperature is 85° F., a mixture comprising 40 pounds of toluenesulfonic acid and 4.9 gallons of methanol is prepared and then added to the ester-dense solvent mixture. This fluid is injected into the formation at a rate of about 900 gallons per hour.

What is claimed is:

1. In a method for treating a well penetrating a subsurface formation and in fluid communication with at least a portion of the subsurface formation, comprising:
   a) providing a consolidating treating fluid comprising a polymerizable resin capable of being acid catalyzed to polymerize in the formation, a polar organic diluent comprising a straight chain hydrolyzable ester up to 6 hydrocarbons, and a predetermined concentration of an oil soluble acid catalyst capable of causing polymerization of the resin at formation temperatures,
   b) injecting said fluid into the formation to enter and saturate at least a portion of the formation adjacent to the well, and
   c) allowing the injected fluids to remain in the formation for a time sufficient to accomplish polymerization of the resin, the improvement comprising:
   d) replacing all or part of said ester and, optionally, all or part of said polymerizable resin with an ester derivative of the polymerizable resin.

2. The method of claim 1 wherein the polymerizable resin of the treating fluid comprises an oligomer or monomer of furfuryl alcohol.

3. The method of claim 2 wherein the concentration of the oligomer of furfuryl alcohol is from 20 to 80 percent by volume of the treating fluid.

4. The method of claim 1 wherein the hydrolyzable ester is selected from the group consisting of ethyl acetate and butyl acetate.

5. The method of claim 1 wherein the concentration of ester in the treating fluid is 80 to 20 percent.

6. The method of claim 1 wherein the oil soluble acid catalyst is selected from the group consisting of orthonitrobenzoic and toluenesulfonic or sulfuric acid.

7. The method of claim 1 wherein the concentration of the oil soluble acid catalyst is 0.25 to 4 percent.

8. The method of claim 1 wherein the ester derivative of the polymerizable resin is an ester of furfuryl alcohol.

9. The method of claim 8 wherein the ester derivative is furfuryl acetate.

10. In a method of consolidating unconsolidated mineral particles including sand in a subterranean petroleum formation penetrated by a well in fluid communication with at least a portion of the formation comprising:
   a) providing a fluid comprising a polymerizable resin, a polar organic diluent for the resin and an oil soluble acid catalyst capable of causing polymerization of the resin at formation temperatures,
   b) the improvement which effectively allows the use of a greater concentration of the oligomer, and provides greater flexibility of set time which comprises replacing between 1% and 100% of the polar organic diluent with an ester derivative of the resin.

11. The method of claim 10 wherein the polymerizable resin of the treating fluid comprises an oligomer of furfuryl alcohol.

12. The method of claim 10 wherein the polar organic diluent is selected from the group consisting of ethyl acetate and butyl acetate.

13. The method of claim 10 wherein the oil soluble acid catalyst is selected from the group consisting of orthonitrobenzoic and toluenesulfonic.

14. The method of claim 10 wherein the ester derivative of the resin is an ester of furfuryl alcohol.

15. The method of claim 14 wherein the ester of furfuryl alcohol is furfuryl acetate.

16. In a improved method for treating a subterranean permeable formation penetrated by a well, said well being in fluid communication with at least a portion of the formation, and said formation including flow channels, to form an impermeable zone in the formation the improvement providing greater safety at the surface, especially where the surface temperature is greater than 85° F., by eliminating boiling at the surface and causing the reaction to be delayed until the treating fluid contacts steam in the subterranean formation, the method including;

introducing into the formation an effective amount of a treating fluid comprising a monomer or oligomer which can be acid catalyzed at the formation temperature to polymerize in the flow channels of the formation, said treating fluid containing 20 to 80 percent of a hydrolyzable ester of less than 6 hydrocarbons and 1 to 4 percent of an effective acid catalyst, the improvement comprising replacing said monomer or oligomer and said ester of less than 6 hydrocarbons with an ester derivative of the monomer or oligomer.

17. The method of claim 16 wherein the ester derivative of the monomer or oligomer is an ester derivative of furfuryl alcohol.

18. The method of claim 17 wherein the ester derivative is furfuryl acetate.

* * * * *